United States Patent [19]

Hamaguchi

[11] Patent Number: 5,386,546

[45] Date of Patent: Jan. 31, 1995

[54] BLOCK SUBSTITUTION METHOD IN A CACHE MEMORY OF A MULTIPROCESSOR SYSTEM

[75] Inventor: Kazumasa Hamaguchi, Kawasaki, Japan

[73] Assignee: Canon Kabushiki Kaisha, Tokyo, Japan

[21] Appl. No.: 799,091

[22] Filed: Nov. 27, 1991

[30] Foreign Application Priority Data

Nov. 29, 1990 [JP] Japan .................................. 2-325895

[51] Int. Cl.⁶ .............................................. G06F 12/12
[52] U.S. Cl. ............................... 395/425; 364/DIG. 1; 364/246.12; 364/243.41; 364/258.1
[58] Field of Search ... 364/200 MS File, 900 MS File; 395/400, 425

[56] References Cited

U.S. PATENT DOCUMENTS

| | | | |
|---|---|---|---|
| 3,848,234 | 11/1974 | MacDonald | 395/425 |
| 4,410,944 | 10/1983 | Kronies | 395/425 |
| 4,429,363 | 1/1984 | Duke et al. | 395/425 |
| 4,463,420 | 7/1984 | Fletcher | 395/425 |
| 4,783,735 | 11/1988 | Miu et al. | 395/425 |
| 4,802,086 | 1/1989 | Gay et al. | 395/425 |
| 5,043,885 | 8/1991 | Robinson | 395/425 |
| 5,224,217 | 1/1993 | Zangenehpour | 395/425 |

Primary Examiner—Joseph L. Dixon
Assistant Examiner—Hiep Nguyen
Attorney, Agent, or Firm—Fitzpatrick, Cella, Harper & Scinto

[57] ABSTRACT

A block substitution method of a cache memory incudes the steps of storing data integrity information with a main memory for each block of the cache memory and calculating a non-reference period of each block. The non-reference periods of the blocks are compared to determine an order of the blocks based on the non-reference periods and a difference between the non-reference period of the block having a longest non-reference period and the non-reference period of other blocks is calculated. Data integrity in the block having the longest non-reference period is examined and when there is no data integrity in that block the data integrity in other blocks is examined in the order of the non-reference period. A block having a longest non-reference period among the blocks having the data integrity is determined and the determined block is selected as a block to be substituted by a new data block when the difference is smaller than a predetermined value. New data is loaded to the selected block.

7 Claims, 5 Drawing Sheets

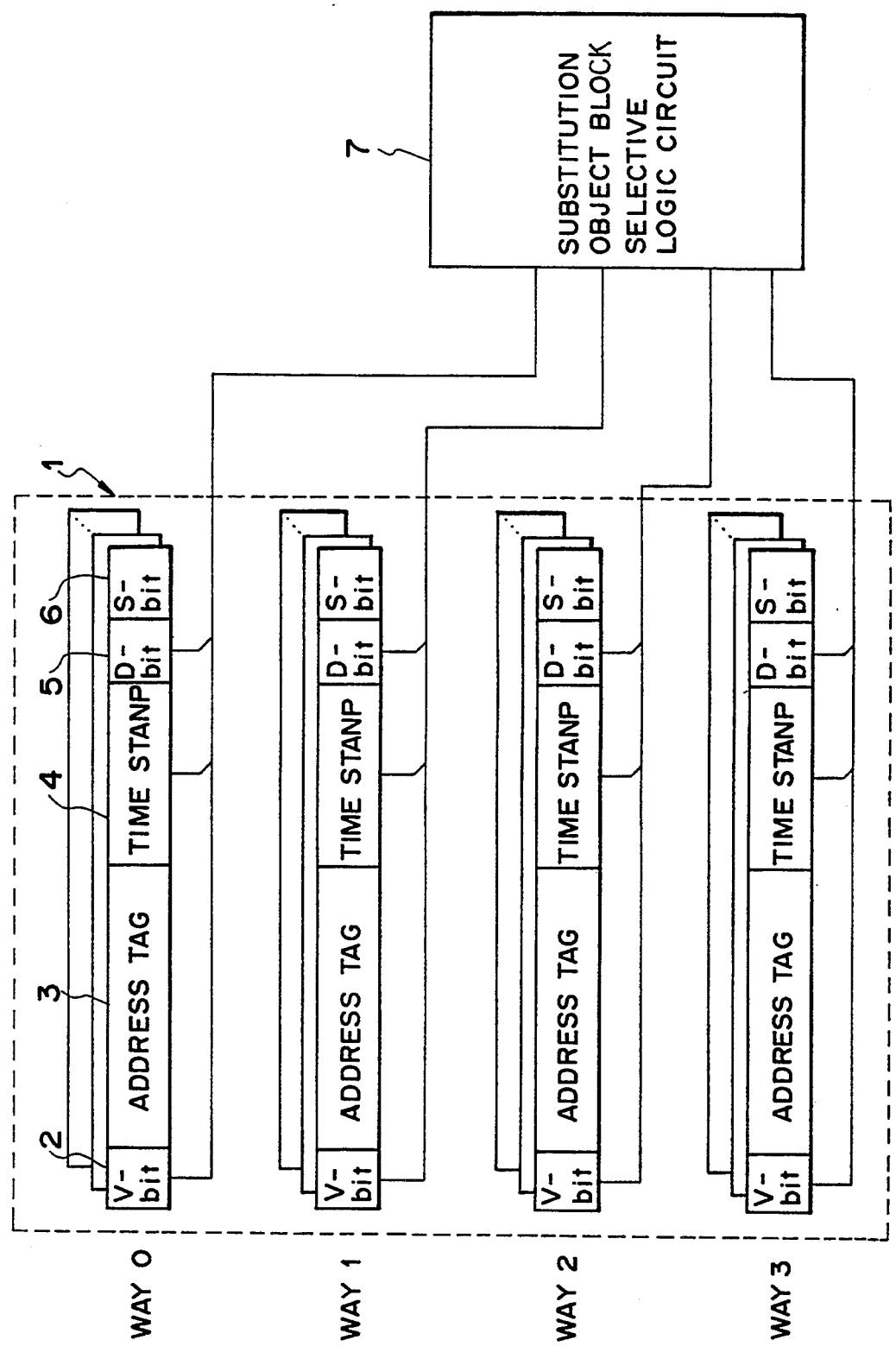

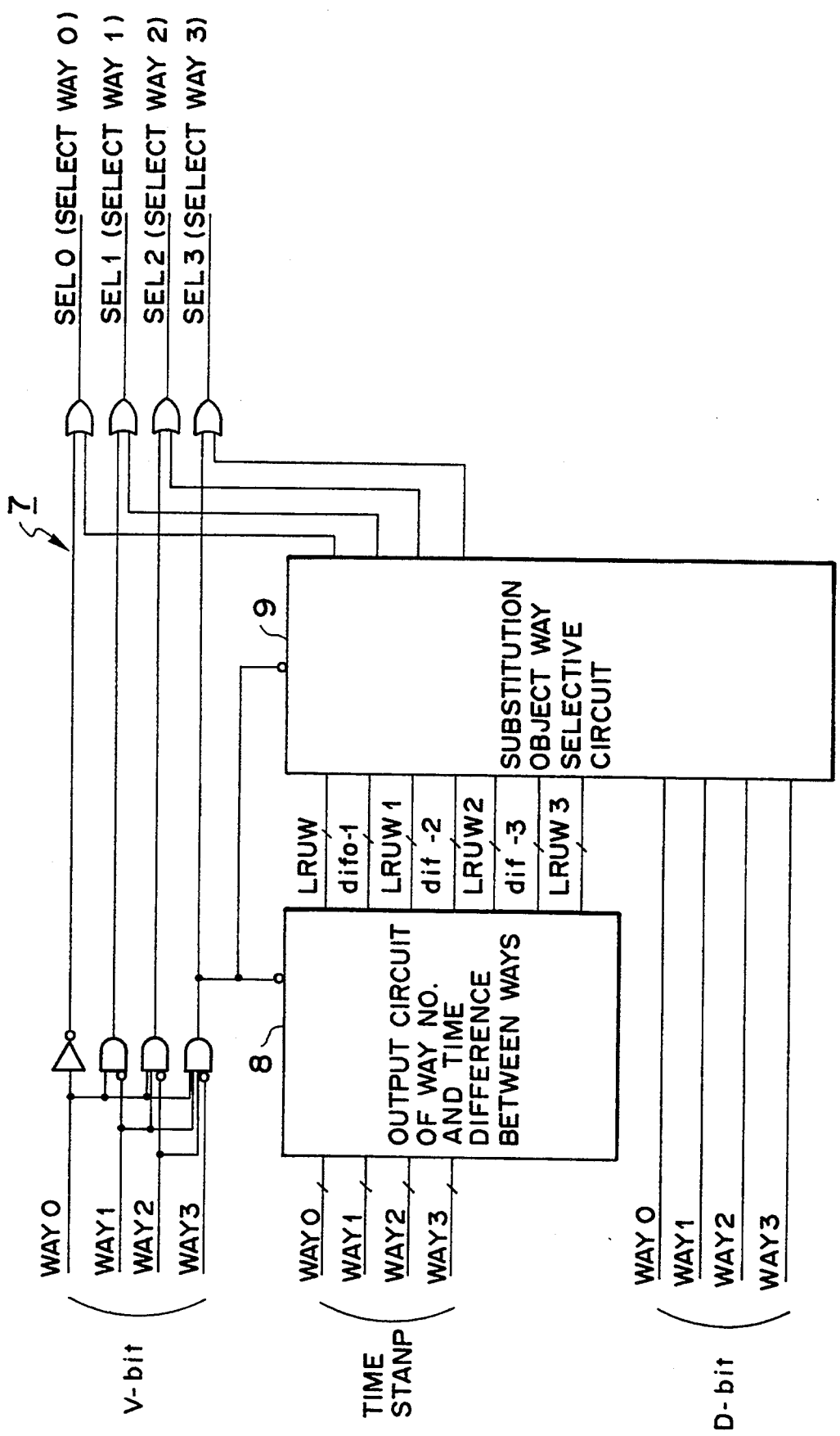

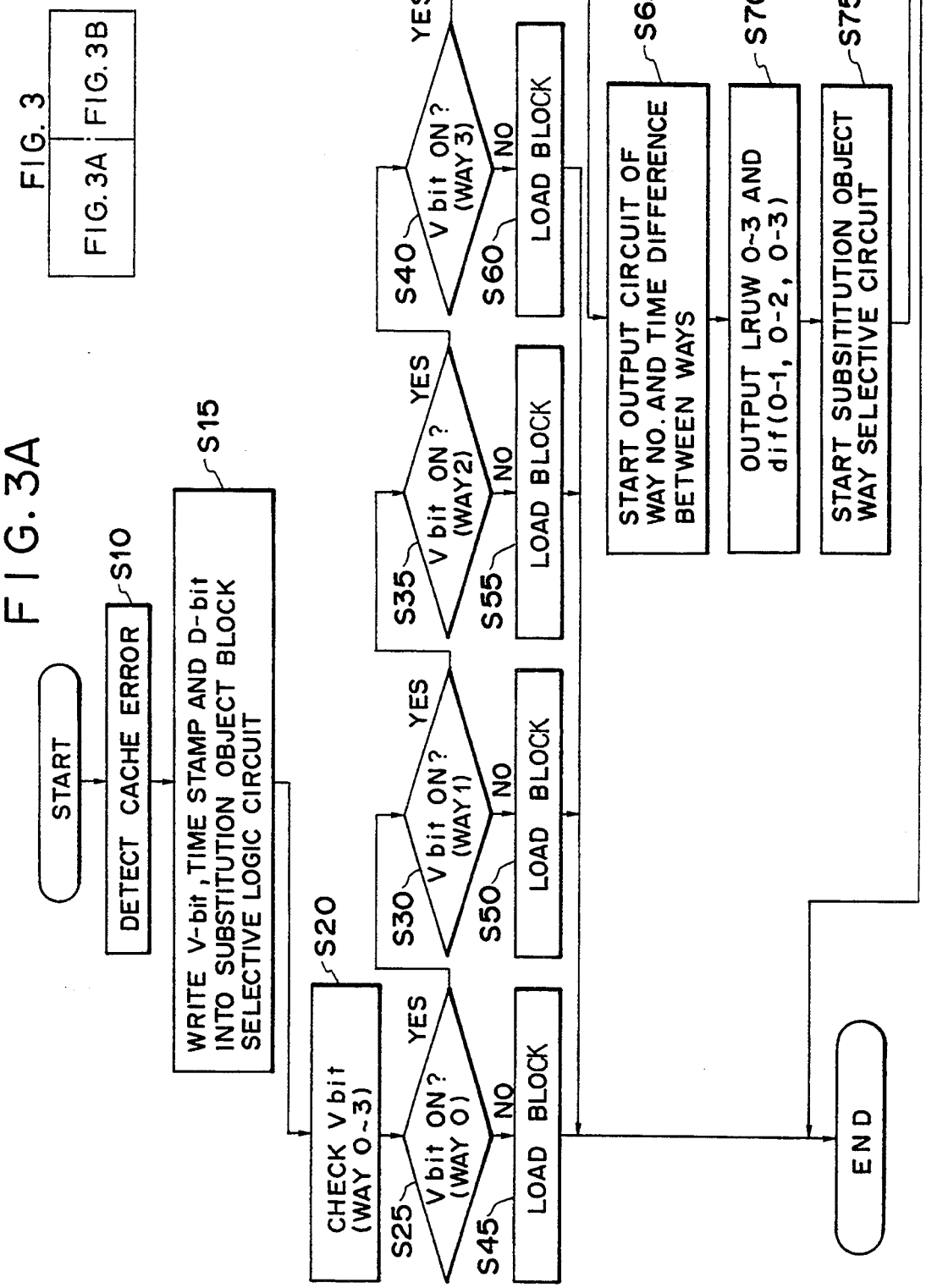

BLOCK SUBSTITUTION METHOD IN A CACHE MEMORY OF A MULTIPROCESSOR SYSTEM

BACKGROUND OF THE INVENTION

1. Field of the Invention

The present invention relates to a block substitution method of a cache memory in a multiprocessor system including a plurality of processors having cache memories.

2. Related Background Art

In a prior art, when a block-to be substituted in a block substitution of a cache memory (hereinafter referred to as a cache) is to be selected, a block which has a lowest possibility of being referred to in a subsequent program execution is selected in view of the localization of reference which is a common characteristic in the program execution. Specifically, an LRU (least recently used) system in which a block among candidate blocks for substitution which has not been referred to for a longest period is selected, or a FIFO (first-in first-out) system in which a block which has been stored at an oldest time is used.

In addition to the selection system (FIFO, LRU, etc.) for the block to be selected in the block substitution, a copy back system in which only data in the cache is updated when a CPU write instruction is issued and a main memory is not updated until updating is needed, that is, until a block which contains the data in the cache is selected for the substitution is used rather than a write through system in which the data in the cache and the data in the main memory are simultaneously updated when the CPU write instruction is issued because it is a sole purpose of the cache to promptly execute a service to a main memory access request of the CPU in a single processor system.

It may be said that the cache has been developed and progressed in the single processor system.

However, since the prior art system is a control system based on the localization of reference, the following problem arises in a multiprocessor system (hereinafter referred to as a system) in which a plurality of processors operate in parallel, for example, a plurality of processors and main memories are coupled through a single bus and a cache is provided in each of the processors.

Data integrity among the caches of the respective processors and between the caches and the main memories must be taken into consideration. When the system uses the copy back system to update the main memory when the CPU write instruction is issued, there occurs inconsistency of data content between the cache and the main memory because the written data is not instantly reflected to the main memory. A block which contains such data is called a dirty block. The write back of the dirty block to the main memory (to restore the data integrity between the main memory and the cache) is effected at the following two timings.

(1) When a cache miss to the block in another processor takes place.

(2) When the block is selected as a block to be substituted in the block substitution system.

In those cases, a bus access is required for the write-back to the main memory. The write-back (1) is an effective bus access in that the data is used in the processor which has caused the cache miss, but the write-back (2) is not an effective bus access in the sense of the effective utilization of data.

Further, in a combination of (1) and (2), that is, when a cache miss to a dirty block takes place in a processor immediately after the block has been written back to the main memory by another processor in accordance with a predetermined block substitution system, the bus access takes places twice to the same block at substantially the same time. One of the bus accesses could be avoided if the write-back of the dirty block to the main memory would be delayed for a while. If such a condition frequently occurs, the frequency of bus access increases and a chance of waiting for the bus access rises and a system performance is lowered.

SUMMARY OF THE INVENTION

It is an object of the present invention to provide a method for efficiently selecting a block to be substituted in the block substitution of a cache memory in a multiprocessor system.

It is another object of the present invention to provide a method for selecting a block to be substituted in a cache memory, which attains data integrity with a main memory.

It is another object of the present invention to provide a method for selecting a block to be substituted of a cache memory which has a low bus access frequency in order to improve an overall system performance.

According to one aspect, the present invention which achieves these objects relates to a block substitution method of a cache memory comprising the steps of storing data integrity information with a main memory for each block of the cache memory, calculating a non-reference period of each block, selecting a block to be substituted based on the data integrity information of the block and the non-reference period, and loading new information to the selected block.

Other objectives and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follows the description for determinating the scope of the invention.

BRIEF DESCRIPTION OF THE DRAWINGS

FIG. 1 shows a configuration of a cache memory in one embodiment,

FIG. 2 shows a configuration of a substitution block selection circuit,

DETAILED DESCRIPTION OF THE PREFERRED EMBODIMENTS

One embodiment of the present invention is now explained with reference to the drawings.

Figure 4:
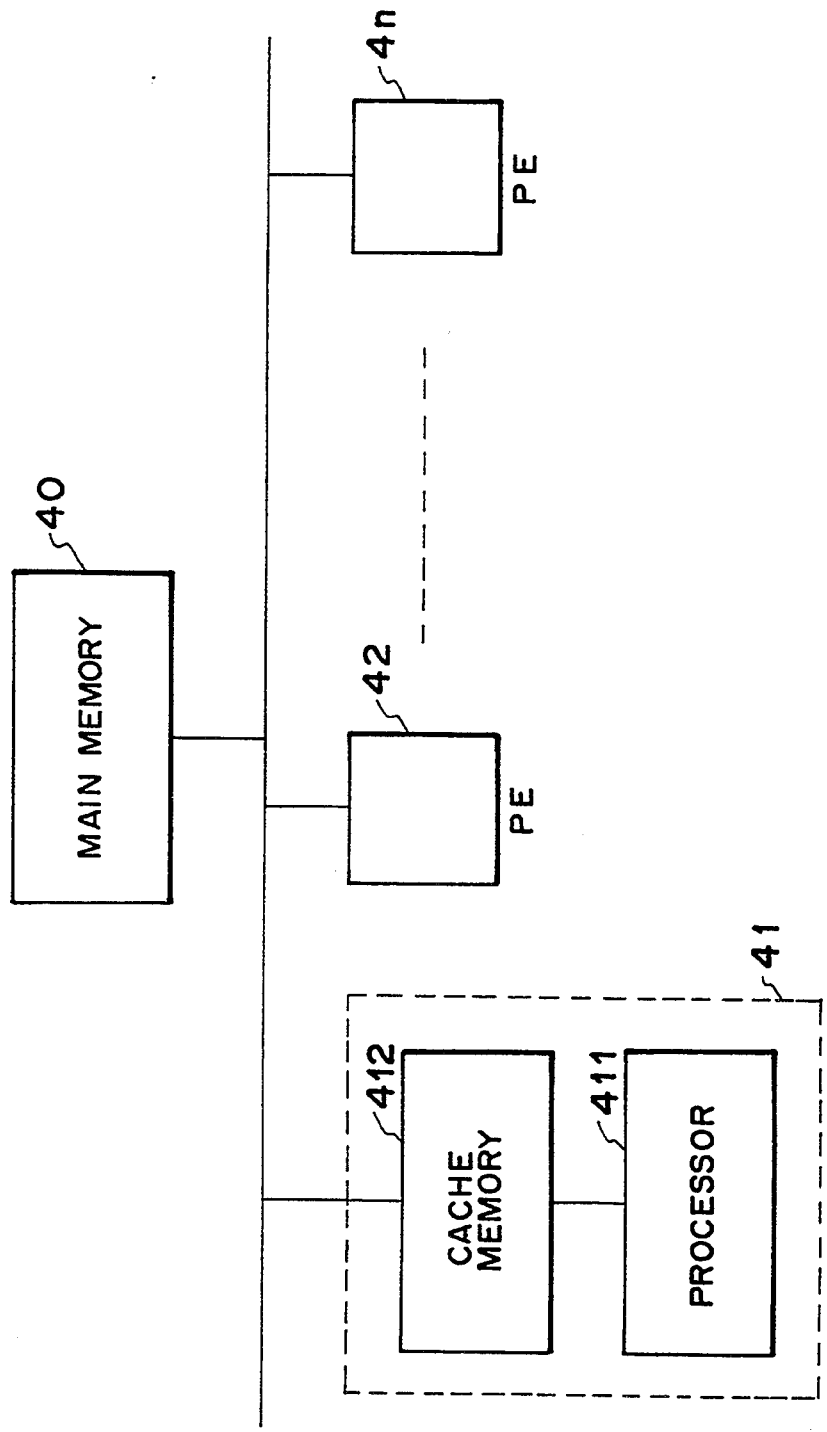
FIG. 4 shows a block diagram of a multiprocessor system in an embodiment.

FIG. 4 shows a configuration of a multiprocessor system in the present embodiment.

Numerals 41, 42, . . . 4n denote processor elements (PE). The PE 41 includes a processor 411 which executes various processings and a cache memory 412 for the processor 411.

The processor 411 accesses to a main memory 40 to copy a portion of information in the main memory 40 to the cache memory 412 for utilization and to update the content as required.

Other PE's are configured and operate in the same manner.

FIG. 1 shows a partial configuration of a 4-way set associative cache memory (hereinafter referred to as a cache) which is a representative embodiment of the present invention. In FIG. 1, numeral 1 denotes a tag array which stores attribute information of a block stored in the cache, numeral 2 denotes a validity bit (V-bit) which indicates whether a valid block is stored in a cache line or not, numeral 3 denotes an address tag which is used in the comparison of address when the cache is accessed, numeral 4 denotes a time stamp which indicate a time when a block stored in the cache line is accessed lastly, and numerals 5 and 6 denote bits which are used to maintain an integrity among the multi-caches and indicate status of the block stored in the cache line. The bit 5 is a dirty bit (D-bit) which indicates whether the integrity between the block and a corresponding block in the main memory is maintained or not, and the bit 6 is a shared bit (S-bit) which indicates whether the same block may have been stored in the cache of another processor or not, Numeral 7 denotes a logic circuit which determines a cache line in which a new block is to be stored when it is loaded in the cache. If a valid block is in the cache line, the V-bit is "1", and if the valid block is not in the cache line, the V-bit is off. If there is integrity between the block of the cache and the corresponding block in the main memory, the D-bit is "0", and if there is no integrity, the D-bit is "1".

FIG. 2 shows a block diagram of a configuration of a substitution block selection circuit 7. Numeral 8 denotes a way number and way time difference output circuit which receives a time stamp from each way and outputs way members LRUWi (i=0~3) in the order of LRU (that is, in a descending order of non-reference period) and differences of time stamps between LRUWo and LRUWi+1 (i=0~2) (dif0-1, dif0-2 and dif0-3), and numeral 9 denotes a substitution way selection circuit which receives the output of the circuit 8 and the D-bits of the respective ways to select the way to be substituted.

Figure 3B:
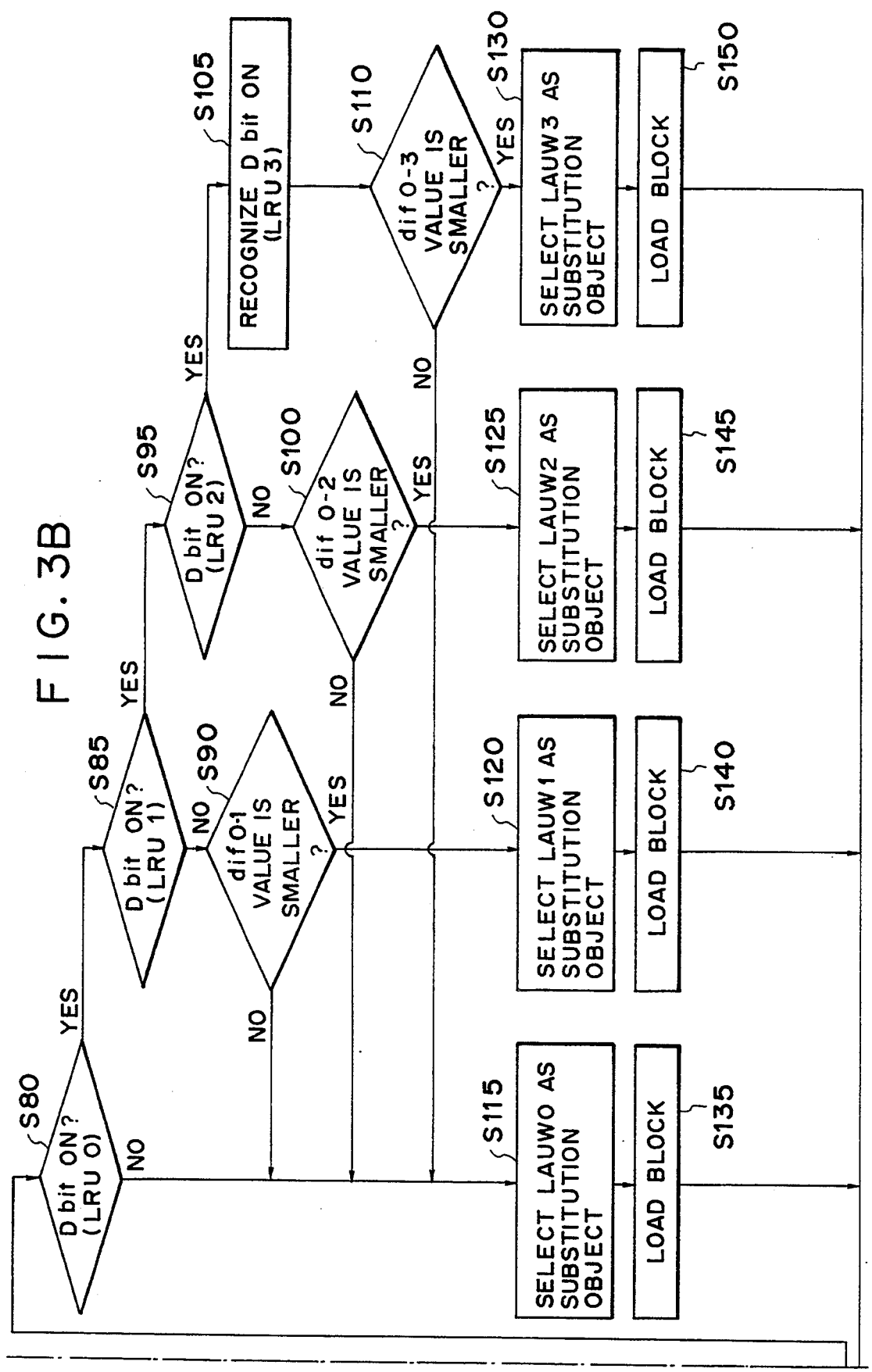
FIGS. 3 (3a–3b) shows a flow chart of a process for selecting a block to be substituted.

A method for selecting the way to be substituted is now explained with reference to a flow chart shown in FIG. 3.

In a step S10, when a cache miss in any processor of the system is detected, the V-bits, the time stamps and the D-bits of all lines of the corresponding set are read from the tag array 1 to the substitution block selection logic circuit 7 in a step S15. In a step S20, the substitution block selection logic circuit 7 examines the presence or absence of an invalid block. In the present embodiment, the V-bits are checked in the order of the way 0, way 1, way 2 and way 3 (steps S25~S40), and if invalid way which has "0" in the V-bit is detected, a new block is loaded to that way (steps S45~S60).

If all ways store valid blocks, the process proceeds to a step S65 to activate the way number and way time difference output circuit 8. In a step S70, the way member and way time difference output circuit 8 outputs way numbers (LRUW0~3) and way time differences (dif0-1, dif0-2 and dif0-3). In a step S75, the substitution way selection circuit 9 is activated to read in the way numbers (LRUW0~3), the way time differences (dif0-1, dif0-2 and dif0-3) and the D-bits of the ways.

The substitution way selection circuit 9 then selects the block to be substituted in the following manner.

In a step S80, it checks whether the D-bit of LRUW0 is "1" or not. If it is "0", that is when there is no need of write-back of data to the main memory because of the data integrity between the cache and the main memory if the way is selected as the block to be substituted, the process proceeds to a step S115 to select the way as the block to be substituted. On the other hand, when the D-bit is "1", that is, when there is need to write back the data to be main memory due to the inconsistency of data between the cache and the main memory if the way is selected as the block to be substituted, the process proceeds to a step S85 to check LRUW1. If the D-bit of LRUW1 is "0", the process further proceeds to a step S90 to examine dif0-1. If dif0-1 is smaller than a predetermined value, that is, if there is no such difference between LRU0 and LRU1, the process proceeds to a step S120 to select LRUW1 as the block to be substituted. On the other hand, if dif0-1 is larger than the predetermined value, that is, if there is a substantial time difference between LRU0 and LRU1, the process proceeds to a step S115 to select LRUW0 as the block to be substituted.

In a similar manner, when the D-bit of LRUW1 is "1", the D-bit of LRUW2 is "1", or the D-bit of LRUW3 is "1", steps S95~S110 are executed, one of steps S115~S130 is selected and one way of LRUW0~LRUW3 is selected as the block to be substituted. Finally, the block to be substituted is loaded in steps S135~S150 in accordance with the steps S115~S130.

In accordance with the present embodiment, the block having the longest non-reference period for data is not automatically selected as the block to be substituted but any block having substantially equal non-reference period for data and the data integrity between the cache and the main memory (which has no need for writing back the data) is selected as the block to be substituted. If there is no block having the data integrity between the cache and the main memory among the blocks having no such difference between the non-reference periods thereof and the longest non-difference period, the block having the longest non-reference period for data is selected as the block to be substituted.

In accordance with the present invention, the block to be substituted is selected not only by the data non-reference period but also with consideration of the data integrity between the cache and the main memory so that the frequency of access between the main memory and the processor is reduced. Accordingly, the overall system performance of the multiprocessor system is enhanced.

What is claimed is:

1. A block substitution method of a cache memory comprising the steps of:
   storing data integrity information with a main memory for each block of the cache memory;
   calculating a non-reference period of each block;
   comparing the non-reference periods of the blocks to determine an order of the blocks based on the non-reference periods;
   calculating a difference between the non-reference period of the block having a longest non-reference period and the non-reference period of other blocks;
   examining data integrity in the block having the longest non-reference period;
   examining the data integrity in other blocks in the order of non-reference period when there is no data integrity in the block having the longest non-reference period;

determining a block having a longest non-reference period among the blocks having the data integrity;

selecting the determined block as a block to be substituted by a new data block when the difference is smaller than a predetermined value; and loading new data to the selected block.

2. A block substitution method according to claim 1 further comprising a step of selecting the block having the longest non-reference period among all blocks as the block to be substituted when the difference of the block having the longest non-reference period among the blocks having the data integrity is larger than the predetermined value.

3. A block substitution method according to claim 1, wherein the block having the longest non-reference period among all blocks is selected as the block to be substituted when there is no data integrity in all blocks of the cache memory.

4. A block substitution method of a cache memory comprising the steps of:

storing status information indicating whether or not a block is to be written in a main memory for each block of the cache memory;

storing time stamp information indicating a last time a block was used, for each block of the cache memory;

calculating a non-reference period of each block based on the time stamp;

selecting a block having a longest non-reference period among the blocks not to be written in the main memory based on the status information and the non-reference period; and substituting new data for the data in the selected block by loading new data to the selected block.

5. A block substitution method according to claim 4, further comprising a step of calculating a difference between the non-reference period of the block having a longest non-reference period and the non-reference period of other blocks.

6. A block substitution method according to claim 5, wherein the block having the longest non-reference period among the blocks not to be written in the main memory is not selected if the difference corresponding to the block is larger than a predetermined value.

7. A block substitution method according to claim 6, wherein the block having the longest non-reference period among all blocks is selected if the difference is larger than the predetermined value.

* * * * *